United States Patent [19]

Knight

[11] Patent Number: 5,561,432
[45] Date of Patent: Oct. 1, 1996

[54] OUT OF PLANE ANTENNA VECTOR SYSTEM AND METHOD

[75] Inventor: Donald T. Knight, Rancho Palos Verdes, Calif.

[73] Assignee: Trimble Navigation, Sunnyvale, Calif.

[21] Appl. No.: 439,759

[22] Filed: May 12, 1995

[51] Int. Cl.$^6$ ...................................... G01S 5/02
[52] U.S. Cl. ............................................ 342/357
[58] Field of Search ........................ 342/357, 442, 342/446, 451

[56] References Cited

U.S. PATENT DOCUMENTS

| | | | |
|---|---|---|---|
| 5,134,407 | 7/1992 | Lorenz et al. | 342/352 |
| 5,185,610 | 2/1993 | Wourd et al. | 342/357 |
| 5,268,695 | 12/1993 | Dentinger et al. | 342/357 |
| 5,296,861 | 3/1994 | Knight | 342/357 |
| 5,329,549 | 7/1994 | Kawasaki | 375/1 |
| 5,402,450 | 3/1995 | Lennen | 375/343 |

Primary Examiner—Thomas H. Tarcza
Assistant Examiner—Dao L. Phan
Attorney, Agent, or Firm—Robert P. Sabath

[57] ABSTRACT

An attitude determination system and method employs first and second baseline determinations comparing the relative phase of carrier signals received from GPS satellites. Attitude determinations include determination of roll, pitch and azimuth of ships, aircraft, vehicles and other devices.

7 Claims, 8 Drawing Sheets

# OUT OF PLANE ANTENNA VECTOR SYSTEM AND METHOD

FIELD OF INVENTION

This invention relates generally to attitude determination with global positioning system (GPS) satellite signals and more specifically to the resolution of carrier cycle integer ambiguities in the carrier phase difference measurement between separate GPS antennas attached to a rigid structures.

BACKGROUND OF THE INVENTION

A current attitude determination system is disclosed in U.S. Pat. No. 5,296,861, showing a flat, triangular antenna array mounted horizontally level in the frame of reference of a selected vehicle. U.S. Pat. No. 5,296,861 is expressly referenced and incorporated herein in its entirety. The antenna array of this U.S. patent may be installed on a plate, which in turn may be mounted on a television antenna rotor. The antenna array includes first and second antenna baselines between a reference antenna and selected first and second other antennas. This patent recites a method at column 22, line 3, of:

"determin[ing] . . . the range of integers that are possible for the first baseline, given only the known constraints on vehicle roll and pitch . . . "

For satellites nearly overhead, only a small range of integers is possible if the vehicle is constrained from significant rolling and pitching. In particular, U.S. Pat. No. 5,296,861 shows step (f) at column 22, line 22, including "calculat[ing] . . . the arc of coordinates that are possible for the second antenna, assuming that the first antenna coordinate is true . . . [and determining] the range of integers that are possible for the second baseline"

The flat antenna array method patented, however, cannot operate, if the array is mounted in three dimensions rather than in the plane of the vehicle which carries it. The methodology of the invention requires users of the attitude determination systems to attach antennas at selected points of a vehicle which are not likely to be aligned with the plane of the transporting vehicle. Instead, the points of attachment of the antennas on the vehicle are likely to be out-of-plane. On aircraft, a common configuration is to mount two antennas on the fuselage, and two more out on wings, producing substantial slope between antenna axes and the vehicle-level frame of reference. Accordingly, the vehicle carrying the antennas can have any azimuth between 0 and 360 degrees, and it can tilt in any direction about level up to some maximum angle, such as 15 degrees, but, notably, this range of motion pertains to the vehicle, not to the antenna sites.

According to a current approach, the antennas are mounted in flat, planar arrays in the vehicle frame of reference, leading to a particular solution for determining the range of possible carrier cycle integers. However, for antennas that are substantially out-of-plane, no method for determining the range of integers is known to be in use.

It is accordingly desirable to develop a system and method for attitude determination which is not dependent upon co-planarity of antenna disposition with the plane of the vehicle on which the antennas are mounted.

SUMMARY OF THE INVENTION

According to the present invention, the range of carrier cycle integers that are possible for first and second antenna baselines are determinable for a vehicle that has an azimuth between 0 and 360 degrees and can tilt in any direction about level up to some maximum angle "$tilt_{max}$" such as 15 degrees according to one embodiment of the present invention. The antennas of the first and second baselines are settable at arbitrary points on the vehicle which carries them, and are not necessarily co-planar with the plane of the vehicle itself. The present invention has the advantages that (1) it will allow the use of antennas substantially out of plane, and (2) that it does not produce a range of carrier cycle integers any greater than necessary.

It is very desirable not to produce a range of integers any greater than necessary, because doing so would increase the computation burden when a minimum likelihood estimation (MLE) direct integer search method processes useless carrier cycle integer combinations. A further advantage of the present invention is that it is highly efficient, computationally. The method of the present invention finds sines and cosines of angles without having to explicitly resort to computer execution of sine/cosine evaluation routines. It does require the evaluation of square roots, but since a math co-processor is being used, square root evaluation takes only about 50% more computation time than a simple floating-point multiply.

DESCRIPTION OF THE PREFERRED EMBODIMENT

Figure 1A:
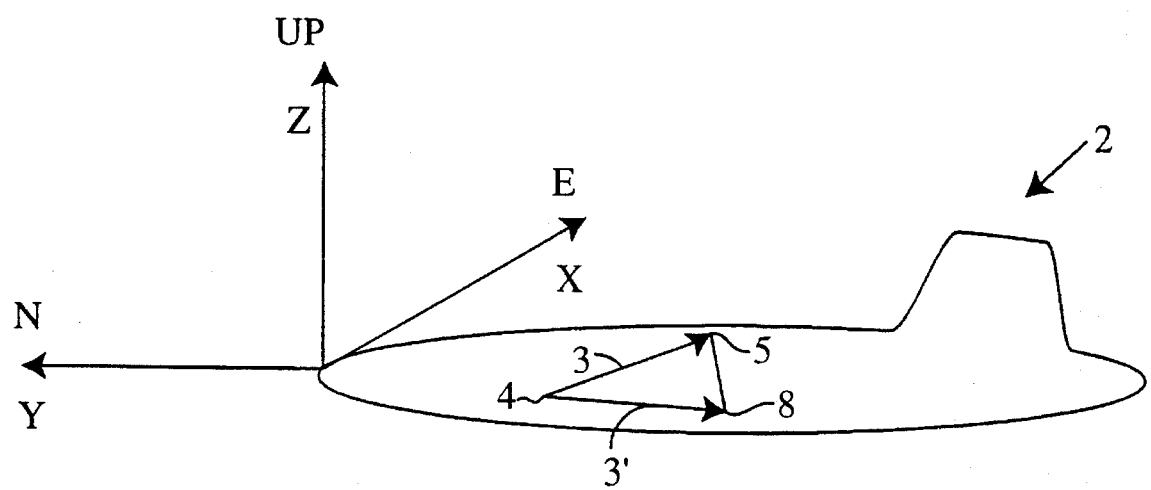
FIG. 1a is a diagram of an attitude determination system of the prior art including a flat, triangular antenna array mounted horizontally level in the frame of reference of a selected vehicle.

As noted above, FIG. 1a shows a current attitude determination system 1 amply disclosed in U.S. Pat. No. 5,296,861. Attitude determination system 1a includes a flat, triangular antenna array 1a mounted horizontally level in the frame of reference of a selected vehicle 2. U.S. Pat. No. 5,296,861 is expressly referenced and incorporated herein in its entirety. Antenna array 1a of U.S. Pat. No. 5,296,861 is installed on a plate 1b, which in turn may be mounted on a television antenna rotor for example (not shown). FIG. 1a further shows a diagram of first and second antenna baselines 3 and 3' respectively between a reference antenna 4 and a selected first and second other antennas 5 and 8. Reference antenna 4 and first other antenna 5, and reference antenna 4 and second other antenna 8 are respectively connected to first and second pairs of first and second phase coherent GPS correlators which are shown in U.S. Pat. No. 5,296,861. The correlators have respective first, second, third, and fourth correlator outputs derived from said GPS satellite radio carrier signal and said first, second, third, and fourth correlator outputs respectively include first and second phase differences. A single computer or a network of computers is connected to said respective first and second and first and third phase coherent GPS correlators for determining first through fourth pluralities of possible attitudes to first through fourth respective GPS satellites based upon respective first and second phase differences between said first and second and said third and fourth correlator outputs for a first radio carrier signal from said respective first through fourth GPS satellites, wherein said first through fourth pluralities of possible attitudes includes more than one possible attitude due to whole cycle carrier phase ambiguities.

Figure 1B:
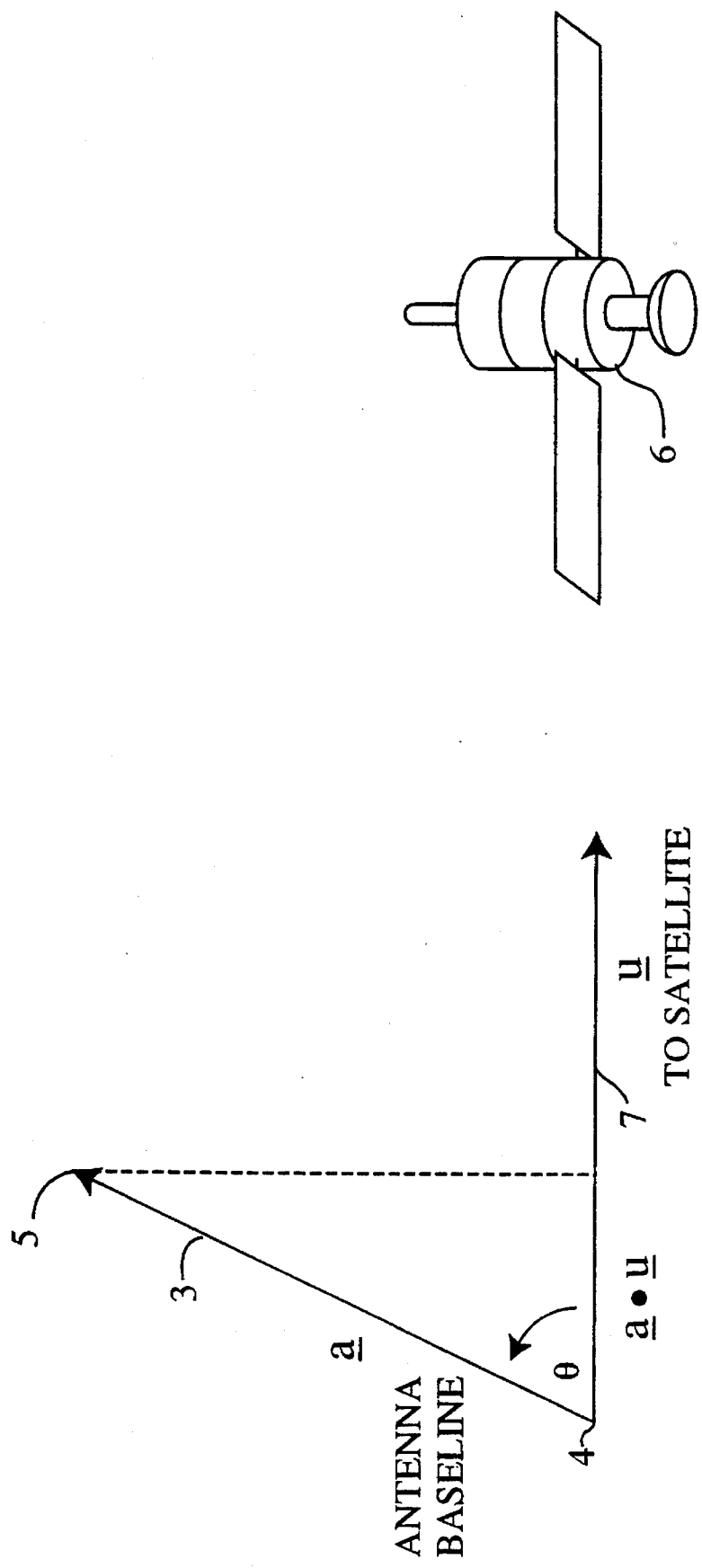
FIG. 1b is a diagram of a first antenna baseline deviating from satellite direction by an angle theta, wherein the dot product of the first antenna baseline with the satellite direction vector is the projection of the first antenna baseline upon the satellite direction vector, consistent with the present invention.

FIG. 1b is a diagram of a first antenna baseline 3 between a reference antenna 4 and a selected other antenna 5 and deviating from the direction of a selected GPS satellite 6 indicated by a satellite direction vector 7 by an angle theta, i.e., "θ." In particular, the dot product of first antenna baseline 3 with satellite direction vector 7 is the projection of first antenna baseline 3 upon satellite direction vector 7, consistent with the present invention. First antenna 6 baseline is described by a vector $a = b \cdot a^B$, where "b" is the length of first antenna baseline 3 in units of GPS carrier wavelengths, (e.g., 19.02 centimeters) and where $a^B$ is a vector of unit length that points along the first baseline in vehicle body coordinates with its origin at reference antenna 4. Further, $u^N$ is a vector of unit length which points from reference antenna 4 into the direction of incident signal arrival from a GPS satellite. $u^N$ points to the satellite, and is expressed in the local navigation coordinates, (e.g., East, North, Up).

Figure 1C:
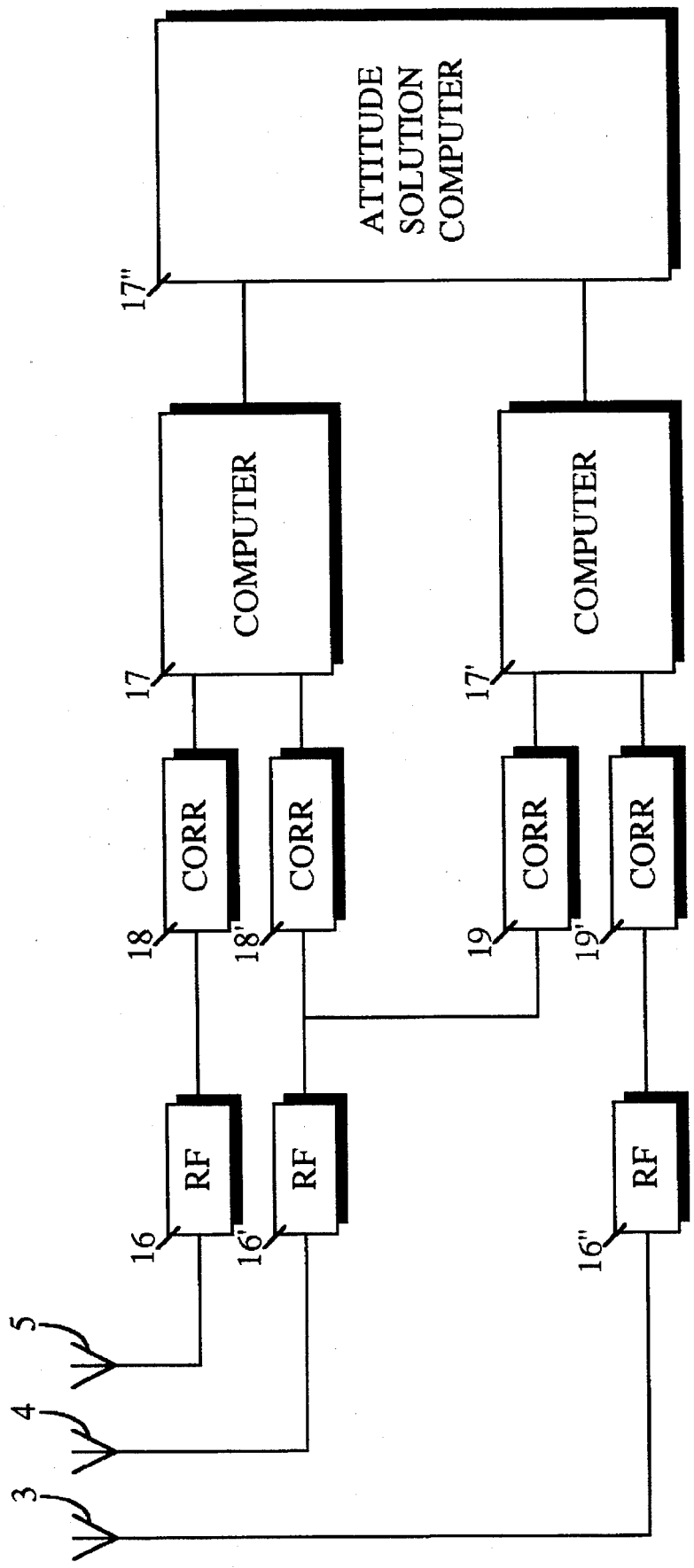
FIG. 1c is a block diagram of an attitude determination system according to the present invention.

FIG. 1c is a block diagram of an attitude determination system according to the present invention. Attitude determination system 1 particularly includes reference antenna 4 and first and second antennas 3 and 5. Attitude determination system 1 further includes radio frequency (RF) stages 16, 16', and 16" which are connected to respective antennas 3, 4, and 5. The attitude determination system further includes correlators 18, 18', 19, and 19'. Correlator 18 is connected with RF stage 16. Correlators 18' and 19 are connected to RF stage 16'. Correlator 19' is connected with RF stage 16". Correlators 18, 18', 19, and 19' receive input signals from the connected one of RF stages 16, 16', and 16". Attitude determination system 1 further includes computer 17, computer 17', and attitude solution computer 17". Computer 17 is connected to correlators 18 and 18'. Computer 17' is connected to correlators 19 and 19'. Computer 17 compares the relative phases of carrier signals from antennas 4 and 5. Computer 17' compares the relative phases of carrier signals from antennas 3 and 4. Computer 17" determines an attitude solution based upon information received from computers 17 and 17'.

As indicated in connection with FIG. 1a, vehicle 2 is defined to have its X axis at the right, for someone in the vehicle facing forward, its Y axis pointing forward, and its Z axis pointing up, relative to the vehicle body. The navigation frame for FIG. 6b as described below, is defined to have its X axis pointing East, its Y axis pointing North, and its Z axis pointing up, relative to the Earth.

If the orientation of vehicle 2 were known, it would be possible to use the antenna baseline vector in body frame $a^B$ to express the baseline vector in navigation frame $a^N$. Further, the "whole value" carrier phase detected or sensed by vector phase measurement hardware would be given by the "vector dot product", $\phi = b \; a^N \cdot u^N + \epsilon$, where ε is measurement error due to receiver noise, and due to error that remains after removing the effects of cable electrical path length.

Unfortunately, a GPS receiver cannot measure "whole value" or correct carrier phase values. Instead, it can only measure phase with a carrier cycle ambiguity. "Whole value" phase is the phase detected by vector hardware, as a fraction of a carrier wavelengths, plus the carrier cycle integer. For example, the whole value phase of 2.25 corresponds to an ambiguous phase measurement of 90 degrees, (0.25 wavelengths,) plus two whole carrier cycles. The angle theta, i.e., "θ" between the first antenna baseline $a^N$ and satellite line-of-sight $u^N$ is given by the vector dot product of $a^N$ and $u^N$, according to the following relationships: $\cos(\theta) = a^N \cdot u^N = a_x^N \cdot u_x^N + a_y^N \cdot a_y^N u_y^N + a_z^N \cdot u_z^N$, where $\cos(\theta)$ means the cosine of angle theta, or θ. See, for example: Murray H. Protter, and Charles B. Morrey, *College Calculus with Analytic Geometry*, Addison-Wesley Publishing Company, Inc., Reading Mass., 1966, page 249. FIG. 1 particularly shows that $a^N \cdot u^N$ is the "projection" of $a^N$ onto $u^N$.

For purposes of analysis, let us assume that vehicle 2 is in an upright position and that it has roll, pitch and azimuth values of zero. In that case, the vehicle body axes, and the local navigation axes coincide and $a^B = a^N$. Now, rotate vehicle 2 in azimuth only, leaving roll and pitch to be zero. The X and Y elements of $a^N$ will clearly vary with the rotation, but the Z component will not be changing. In other words, $a_z^N = a_z^N$ regardless of azimuth, as long as roll and pitch are zero.

Further, it is notable that the dot product, $$p = a_x^N \cdot u_x^N + a_y^N \cdot a_y^N u_y^N + a_z^N \cdot u_z^N,$$

where $$q1 = a_z^N \cdot u_z^N,$$

and $$q2 = a_x^N \cdot u_x^N + a_y^N \cdot a_y^N u_y^N.$$

Further, the dot product "p" has a part $q_1$ that remains constant, if the vehicle is rotated only in azimuth. Since $q_1$ is constant, its contribution to the projection can be subtracted, leaving $q_2$ in two dimensions. This simplifies analysis, because two-dimensional problem is easier to solve that a three-dimensional problem. Additionally, $q_2$ can have a magnitude up to:

$$[((a_x^B)^2+(a_x^B)^2)((u_y^N)^2+(u_y^N)^2)]^{1/2},$$

because $a_z^N = a_z^B$, with the result that:

$$((a_x^B)^2+(a_y^B)^2)=((a_x^N)^2+(a_y^N)^2).$$

Further, $q_2$ is at a maximum when vectors a and u align in two dimensions. The vector dot product, p, can lie in the range $q_1-q_{2max}$ when vehicle roll and pitch are zero.

For zero values of vehicle roll and pitch, the maximum angle $\theta_{max}$ that can be achieved in FIG. 1a is $$\cos(\theta_{max})=a_z^B \cdot u_z^N - [((a_x^B)^2+(a_x^B)^2)((u_y^N)^2+(u_y^N)^2)]^{1/2}.$$

and the minimum angle "$\theta_{min}$" that can be achieved in FIG. 1a is $$\cos(\theta_{min})=a_z^B \cdot u_z^N + [((a_x^B)^2+(a_x^B)^2)((u_y^N)^2+(u_y^N)^2)]^{1/2}.$$

Figure 2:
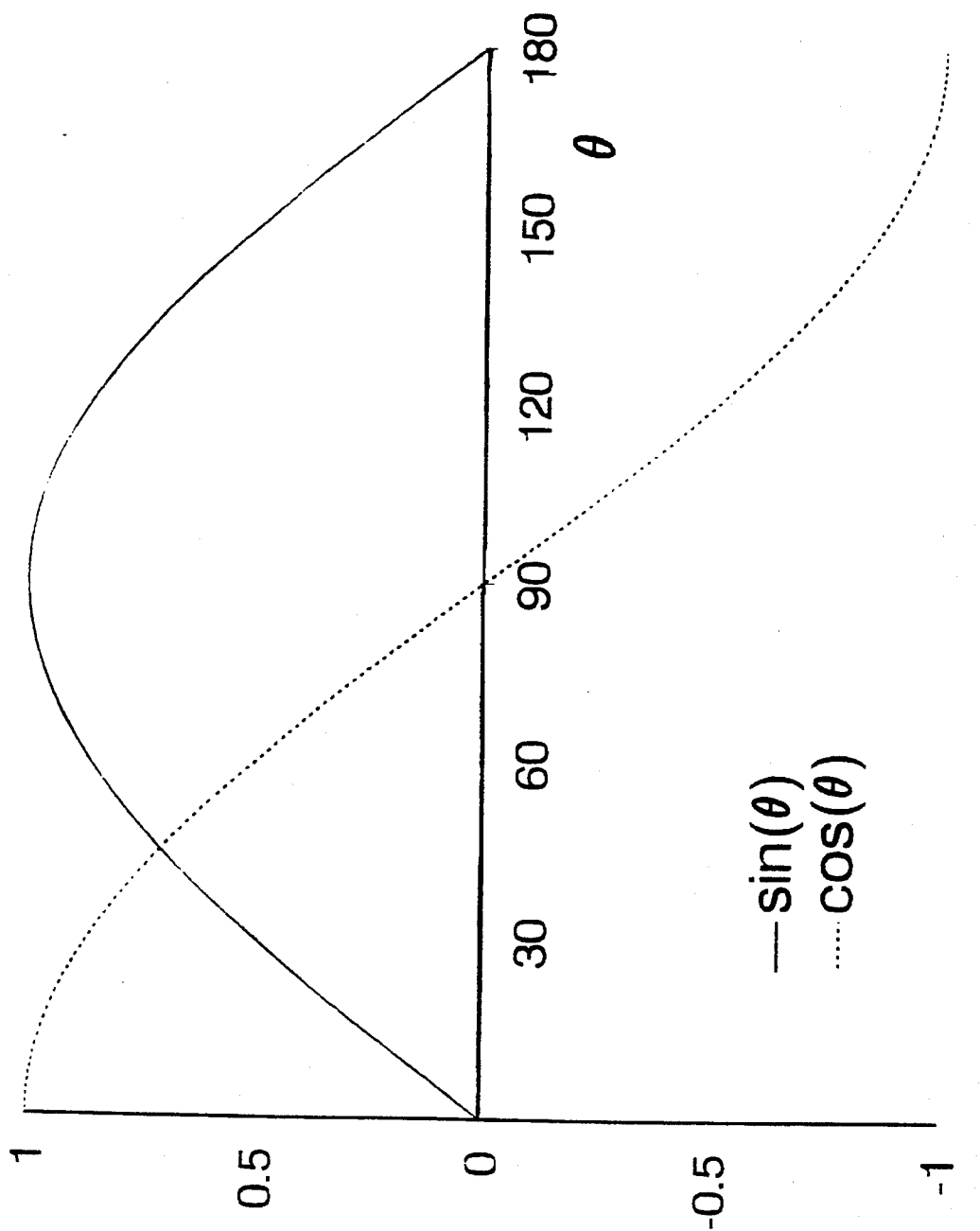
FIG. 2 is a graph of sine theta and cosine theta as a function of theta, consistent with the present invention, where theta is the angle of deviation from the first antenna baseline from satellite direction.

FIG. 2 is a graph of sine $\theta$ and cosine $\theta$ as a function of $\theta$, consistent with the present invention, where $\theta$ is the angle of deviation from the first antenna baseline from satellite direction. Further, from the relationship, $\sin^2((\theta))+\cos^2((\theta))=1$, and from FIG. 2, $$\sin(\theta_{max})=[1-(\cos(\theta_{max})^2)]^{1/2},$$

and $$\sin(\theta_{min})=[1-(\cos(\theta_{min})^2)]^{1/2}.$$

Now, imagine turning the vehicle around in azimuth so that $\theta$ is at a maximum, $\theta_{max}$, and then additionally tilting the vehicle to maximum tilt, so that the total angle $\theta=\theta_{max}+\text{tilt}_{max}$ is as large as possible. If the new angle $\theta$ is larger than 180°, then it is possible for the first antenna baseline to lie parallel to u, and pointing away from the GPS satellite. It can accordingly be concluded that the most p can ever be in the negative direction is $-b$, where b is the first antenna baseline length.

If $\theta=\theta_{max}+\text{tilt}_{max}$ is less than 180°, then the most p can be, in the negative direction, is $b \cdot \cos(\theta_{max}+\text{tilt}_{max})$. Further, the sine and cosine of $((\theta_{max}+\text{tilt}_{max})$ follow trigonometric identities, $\sin(A+B)=\sin(A)\cos(B)+\cos(A)\sin(B)$, and $\cos(A+B)=\cos(A)\cos(B)-\sin(A)\sin(B)$. This leads to the conclusions, that $\sin((\theta_{max}+\text{tilt}_{max})=\sin((\theta_{max})\cos(\text{tilt}_{max})+\cos((\theta_{max})\sin(\text{tilt}_{max})$, and that $\cos((\theta_{max}+\text{tilt}_{max})=\cos(\theta_{max})\cos(\text{tilt}_{max})-\sin((\theta_{max})\sin(\text{tilt}_{max})$.

From FIG. 2, the combined angle $(\theta_{min}-\text{tilt}_{max}$ is less than 0° for negative values of $\sin((\theta_{min}-\text{tilt}_{max})$. The foregoing is sufficient to complete an method to determine the range of carrier cycle integers for first baseline. The method, described below, allows for all possible carrier cycle integers, without allowing any extra integers.

The method to determine carrier cycle from . . . to range for baseline 1 is expressed in pseudo-code below. This provides min/max limit software for a first baseline, wherein azimuth can be anything about a local vertical position, and roll and pitch are limited, for out-of-plane antennas not in the plane of the vehicle on which they are mounted.

PROGRAM FOR ESTABLISHING A FIRST BASELINE

{ define a vector and a matrix } type vec = array [1..3] of double;
    mat = array [1..3, 1..3] of double;

const { constants }

{ conversion from degrees to radians }

DEGREES = 0.0174532925199433;

{ azimuth and elevation to satellite } sat_az = 27 * DEGREES;
sat_el = 90 * DEGREES;

{ first baseline antenna vector, vehicle body frame, in wavelengths } a:vec = (6,2,1);

{ maximum that the vehicle can tip or tilt away from level } max_tip = 20 * DEGREES;

{ to make indices into arrays easier to read } x = 1;
y = 2;
z = 3;

{ program variables accessible to all } var
    u,a1: vec;
    ct,st: double;
    irand,icycle: longint;
    b,q1,q2,p1,p2,r1,r2,pmin,pmax,temp: double;

```
az,pitch,roll: double;
cbl: mat;
p,apmin,apmax: double;
i: integer;
```

{------------------------------}
{   utility routines       }
{------------------------------}

{ vector dot product }

```
function dot (A,B: vec): double;
begin
  dot := a[1]*b[1] + a[2]*b[2] + a[3]*b[3];
end;
```

{ Uniform [0..1] random number generator. }

```
function unif: double;
  begin
  irand := irand * 1295802987;
  unif := ((irand / (2147483647.0 * 2)) + 0.5);
  end;
```

{ compute body-to-level direction cosines from attitude euler
    angles }
```
procedure computecbl ( roll, pitch, azimuth: double;
    var cbl: mat );
var
  sr,sp,sa, cr,cp,ca: double;
  srsp, srcp, crsp, crcp: double;

begin
  sr := sin( roll   );
```

```
    sp := sin( pitch   );
    sa := sin( azimuth );
    cr := cos( roll    );
    cp := cos( pitch   );
    ca := cos( azimuth );
    srsp := sr * sp;
    srcp := sr * cp;
    crsp := cr * sp;
    crcp := cr * cp;
    cbl[1,1] := cr*ca+sa*srsp;
    cbl[2,1] := -cr*sa+ca*srsp;
    cbl[3,1] := -srcp;
    cbl[1,2] := cp*sa;
    cbl[2,2] := cp*ca;
    cbl[3,2] := sp;
    cbl[1,3] := sr*ca-sa*crsp;
    cbl[2,3] := -sa*sr-ca*crsp;
    cbl[3,3] := crcp;
end;
```

```
{---------------------------------------------------------}
{  main driver, with embedded method under test           }
{---------------------------------------------------------}
begin { seed of random number generator } irand := -95870258;

{ satellite line-of-sight, in east/north/up frame } u[1] := sin(sat_az) * cos(sat_el);
    u[2] := cos(sat_az) * cos(sat_el);
    u[3] := sin(sat_el);

{ sine, cosine of max tip }
```

```
st := sin(max_tip);
ct := cos(max_tip);
```

{baselength}

```
b := sqrt(dot(a,a));
```

```
{ ------------------------ }
{  Method under test  }
{ ------------------------ }
```

```
q1 := u[z] * a[z];
q2 := sqrt( (u[x]*u[x]+u[y]*u[y]) * (a[x]*a[x]+a[y]*a[y]) );
```

{ max projection }

```
p1 := (q1 + q2) / b;
temp := 1 - p1*p1;
if temp <=0 then p2 := 0 else p2 := sqrt(temp);
```

```
r1 := p1*ct + p2*st;
r2 := p2*ct - p1*st;
```

```
if r2 < 0 then pmax := b else pmax := b*r1;
```

{ min projection }

```
p1 := (q1 - q2) / b;
temp := 1 - p1*p1;
if temp <=0 then p2 := 0 else p2 := sqrt(temp);
```

```
r1 := p1*ct - p2*st;
r2 := p2*ct + p1*st;

if r2 < 0 then pmin := -b else pmin := b*r1;

{ -------------------------------- }
        { End of method under test }
        { -------------------------------- }

{ Now see if it worked }
    { set up the search for minimum and maximum projection
of antenna baseline onto satellite direction of incident signal arrival } apmin := +9e9;
apmax := -9e9;

{ cycle through a large number of vehicle test attitudes } for icycle := 1 to 5000 do
  begin

{ Azimuth anything from 0-366 degrees, roll and pitch
          uniformly distributed. Discard attitudes until one is z
          found satisfying vehicle tilt or tip limits. } az := unif * 360 * DEGREES;

repeat pitch := (unif*2-1) * max_tip;
```

```
    roll := (unif*2-1) * max_tip;
until sqrt(roll*roll + pitch*pitch) <= max_tip;
```

{Vehicle body-to-level direction cosines, based on euler angles.}

```
computecbl ( roll,pitch,az, cbl );
```

{antenna baseline number 1, expressed in east/north/up coordinates}

```
for i := 1 to 3 do al[i] := cbl[i,1]*a[1] + cbl[i,2]*a[2] +cbl[i,3]*a[3];
```

{whole value phase. The projection of antenna baseline 1 onto the incident direction of GPS signal arrival.}

```
    p := dot(al,u);
```
{Solve for the minimum and maximum whole-valued phase, over the full range of vehicle attitudes generated randomly.}

```
    if apmin > p then apmin := p;

if apmax < p then apmax := p;
```

{ Finally, compare pmin and pmax, from method under test, with apmin and apmax, from the test with random attitudes. Test is successful if pmax is slightly greater than apmax, and pmin is slightly smaller than apmin, with a small margin of error. }

```
    end;

end.
```

The method above for determining the first baseline can be made more efficient by computing measurement error standard deviation ahead of time. There is little incentive to make the method as fast as possible, however, at the expense of increasing software complexity. The method for first baseline only has to be executed once per integer search, and search time is dominated by the nested search loop. The method for second baseline may have to execute thousands of times per search, so efficiency is more important for the second baseline. Theoretically, the test for (1−p1*p1)<0 shouldn't be necessary, but it is included to avoid a possible square root of negative number, in case of a small computer round-off error. Sine and cosine of maximum vehicle tilt are computed ahead of the method, since they will also be needed for the second baseline computations.

The method for first baseline was tested under a number of different conditions, according to satellite azimuth and elevation, antenna baseline vector in vehicle body frame, and maximum vehicle tilt. Under each condition tried, the minimum and maximum projection of antenna baseline vector onto the direction of incident signal arrival was obtained using the above method. The projection limits were then tested by randomly generating a sample of 5,000 (five thousand) vehicle orientations satisfying the vehicle tilt limitation, and then computing the actual projections of antenna baseline vector onto the direction of incident signal arrival. It was verified that the maximum projection seen in 5,000 samples was almost as large as the predicted maximum, but never larger. It was also verified that the smallest projection seen in 5,000 samples was almost as small as predicted, but never smaller.

Figure 3:
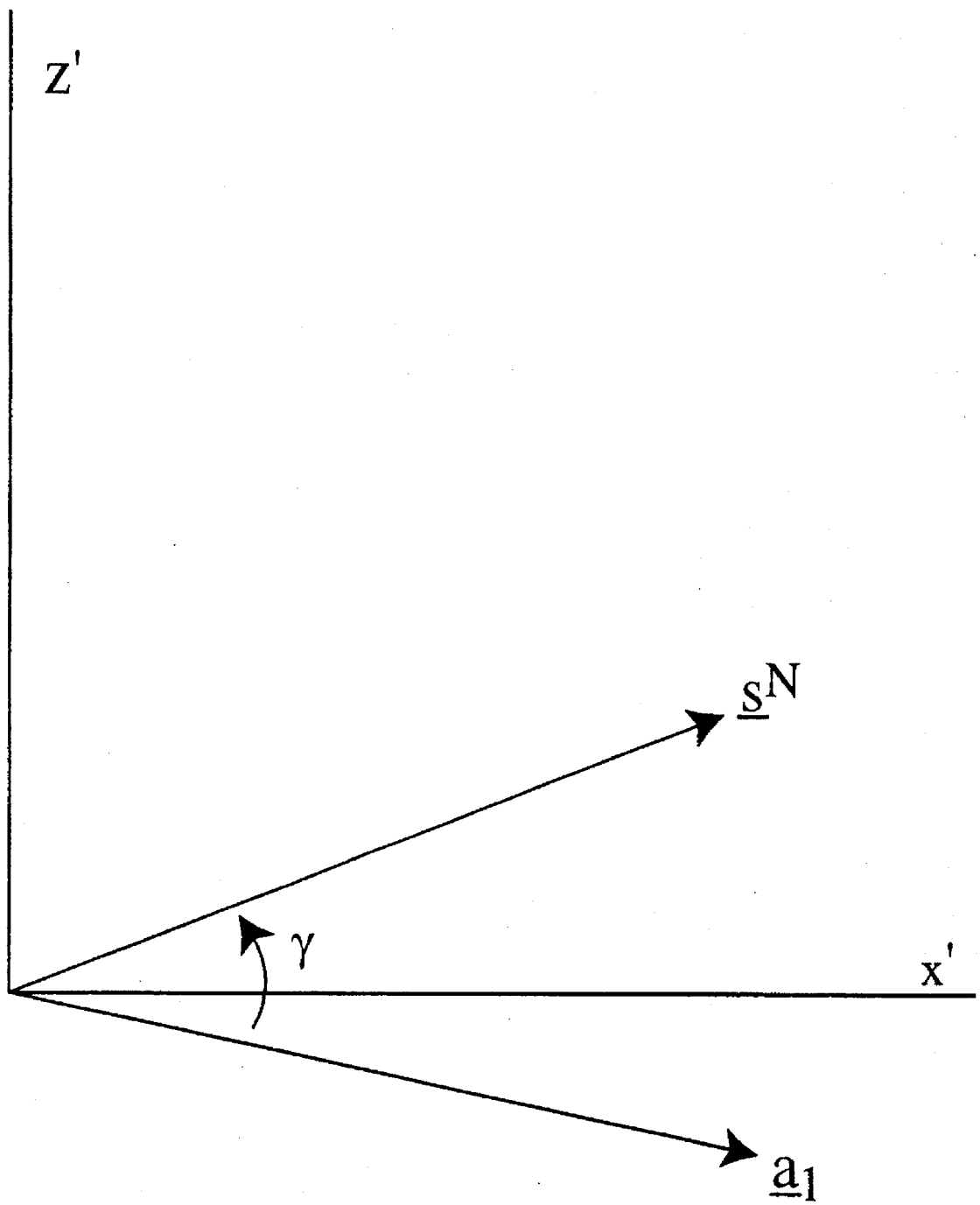
FIG. 3 is a diagram of a first antenna baseline deviating from a candidate vector describing a possible first baseline wherein the angle between the first antenna baseline and the candidate vector is gamma in a two dimensional reference frame represented by coordinates x' and z', consistent with the present invention.
Figure 4:
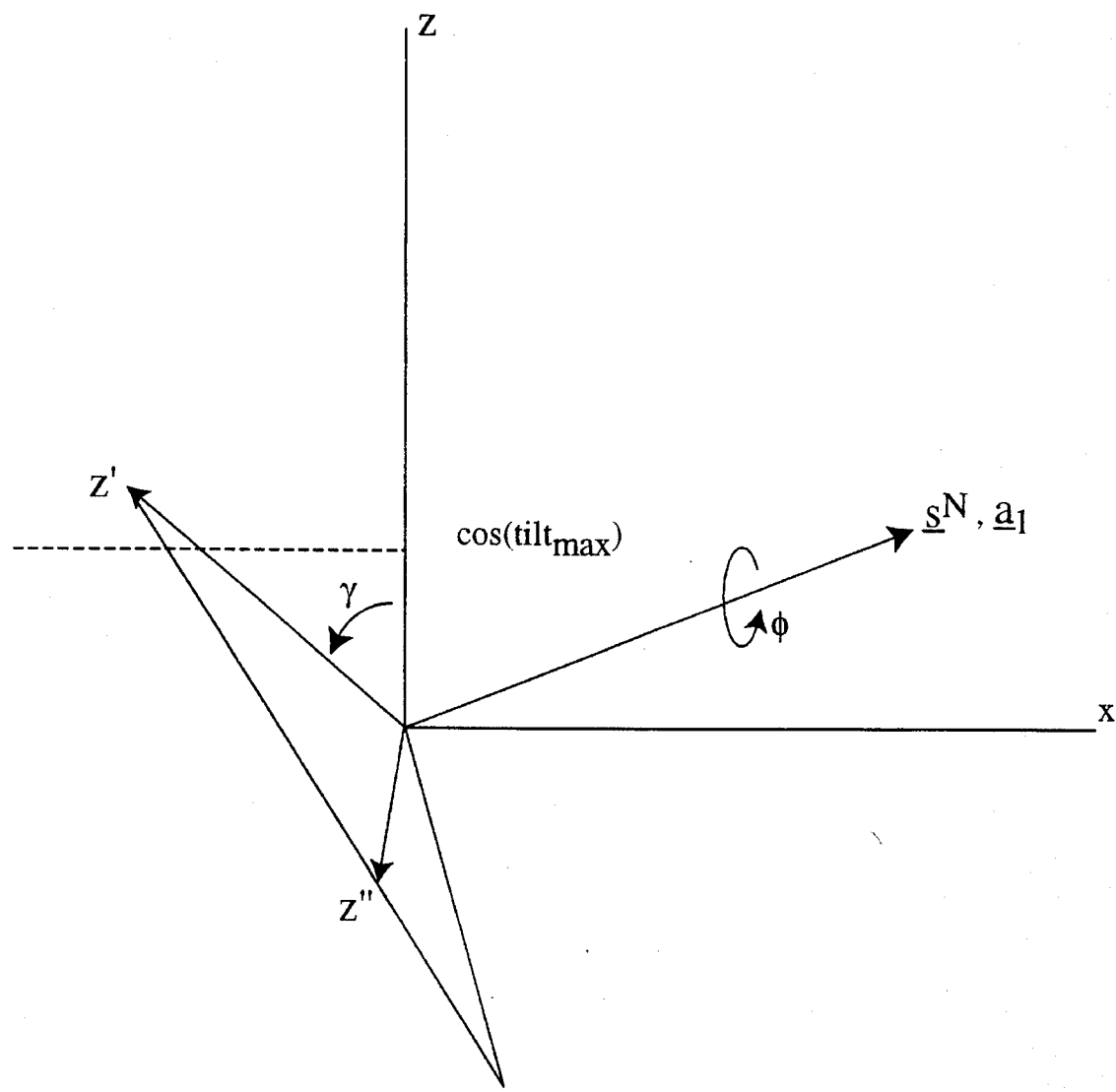
FIG. 4 is a diagram showing the method of pointing the first baseline into the candidate vector and then swinging the antenna array around the first baseline by an angle phi, permitting determination of arc subject to tilt limitations and determining minimum and maximum projections of the second antenna baseline onto all satellite directions of incident signal arrival, according to the present invention.

FIG. 3 is a diagram of a first antenna baseline deviating from a candidate vector describing a possible first baseline wherein the angle between the first antenna baseline and the candidate vector is gamma in a two dimensional reference frame represented by coordinates x' and z', consistent with the present invention. FIG. 4 is a diagram showing the method of pointing the first baseline into the candidate vector and then swinging the antenna array around the first baseline by an angle phi, permitting determination of arc subject to tilt limitations and determining minimum and maximum projections of the second antenna baseline onto all satellite directions of incident signal arrival, according to the present invention. The method for second baseline executes at a time, in the overall processing described by U.S. Pat. No. 5,296,861, at which integer search is underway through a range of carrier cycle integers determined for the first baseline, and at which a candidate vector $s^N$ has been generated which describes a possible first baseline.

The purpose of the method, at this point, is to determine the range of carrier cycle integers that are possible for the second baseline. Supposing that $s^N$ does indeed describe the first antenna baseline, then the second baseline outer antenna has to lie somewhere along an arc that one would obtain by pointing the first baseline $a_1$ into $s^N$ and then swinging the antenna array around $a_1$. Usually, only a small arc is possible for the second baseline, considering tilt limits of the vehicle. It is necessary to calculate that arc, then find the minimum and maximum projections of second antenna baseline onto all the satellite directions u of incident signal arrival, and then use the minimum and maximum projections to solve for the possible range of carrier cycle integers on second baseline for each satellite. Having the from . . . to limits for carrier cycles on second baseline, the integer search which has begun on first baseline is then continued onto the second baseline.

As described in U.S. Pat. No. 5,296,861, integer searches on the first two baselines are first carried out in ordinary Cartesian coordinates, (in the navigation frame; East, North, Up.) Each time a pair of likely antenna coordinates is found, one for each baseline, the pair is used to create a nominal vehicle attitude, and the solution is then linearized about that nominal attitude, meaning that small angular perturbations about a nominal attitude are sought which yield the final attitude solution.

The immediate problem for second baseline is to figure out what range of motion is possible for the vehicle, given that first baseline is aligned with $s^N$. Notice that the vehicle is already tilted, somewhat, just by aligning the first baseline with $s^N$. It has to be determined what range of vehicle motion is "left over." If the vehicle has to be tilted to the maximum just in order to align $a_1$ with $s^N$, then only one orientation is possible. Usually, there is a range ±ϕ of angles by which vehicle could be rotated about $s^N$ and still remain within the vehicle maximum tilt.

The first step is to begin with the vehicle level and facing North. That aligns the body (B) XYZ coordinate frame axes with the navigation (N) coordinate frame axes (East, North, Up.) Now, twirl the vehicle about vertical, (a change in vehicle azimuth or bearing,) so that antenna baseline 1 is either directly under or over the supposed solution $s^N$ for antenna baseline 1. Create a new coordinate system so that $s^N$, $a_1$, and the X' axis of the new coordinate system are all in a vertical plane, as shown in FIG. 3, with γ as the angle between $s^N$ and $a_1$. Then, tilt the vehicle up (or down) by γ to bring $a_1$ into alignment with $s^N$. Finally, rotate the vehicle by ϕ, pivoting about $s^N$. FIG. 4 shows a Z" axis that has resulted from tilting the Z axis back by γ, to give Z', and then rotating by an angle ϕ, pivoting about $s^N$. If ϕ is rotated through 360 degrees, then the Z" axis sweeps out an inclined circle, as is shown in the figure. Generally, only part of that circle can be reached without exceeding maximum vehicle tilt. To find that part, slice through the figure with a horizontal plane that cuts the Z axis at $\cos(tilt_{max})$. Vehicle tilt is within its allowable range when Z" is on any portion of the circle that lies above the $\cos(tilt_{max})$ plane. The limits of ϕ are given by the two points where Z"=(x",y",z") just touches the plane, or where z"= $\cos(tilt_{max})$.

Figure 5:
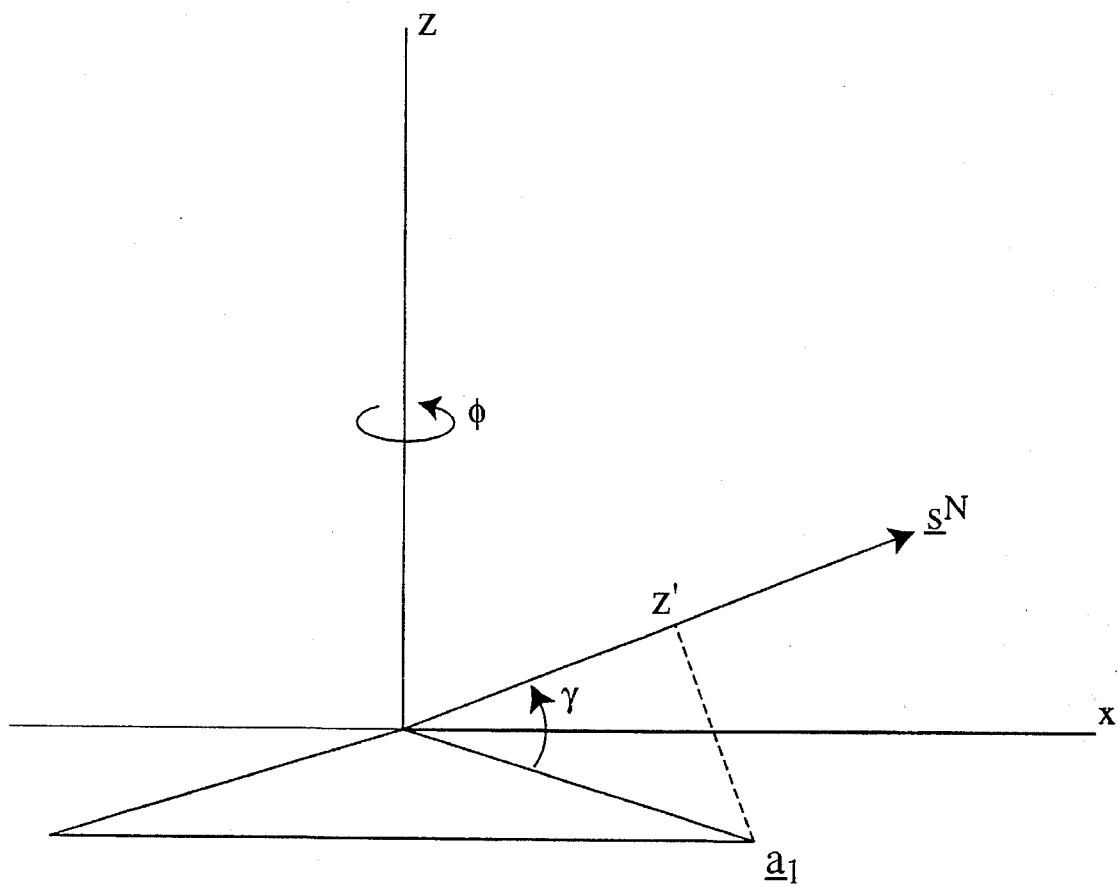
FIG. 5 is a diagram laying FIG. 4 on its side, turning it around, and re-labeling the axes, establishing z" by vehicle twisting until the first baseline lies directly under or over the candidate vector, twisting the vehicle by an angle phi and projecting the first baseline onto according to the present invention.

FIG. 5 is a diagram laying FIG. 4 on its side, turning it around, and re-labeling the axes, establishing z" by vehicle twisting until the first baseline lies directly under or over the candidate vector, twisting the vehicle by an angle ϕ and projecting the first baseline onto according to the present invention.

It simplifies the solution for z" to take the diagram in FIG. 4, lay it on its side, turn it around, and re-label axes as shown in FIG. 5. By similarity of diagrams, z" is given by twisting the vehicle until $a_1$ lies directly under or over $s^N$, twirling by an additional angle ϕ, and then projecting $a_1$ onto $s^N$. The solution for z" can then be written down immediately as $$z'' = a_z^B s_z^N + \cos(\theta) \sqrt{(a_x^B)^2 + (a_y^B)^2} \sqrt{(s_x^N)^2 + (s_y^N)^2}$$

As was done in the previous section, use is made of the fact that $a_z^N = a_z^B$, and $$\sqrt{(a_x^B)^2 + (a_y^B)^2} = \sqrt{(a_x^N)^2 + (a_y^N)^2},$$

provided that the vehicle is only rotated in azimuth, with zero roll and pitch.

The vector dot product can be split up into a vertical part which is independent of azimuth, plus the dot product in two dimensions of the X-Y components of $a_1$ and $s^N$.

The last step is to set $z''=\cos(tilt_{max})$ and solve for the extremes of $\phi$, subject to the following relationships:

$$\cos(\theta_{max}) = ((\cos(tilt_{max}) - a_z^B s_z^N)/\sqrt{(a_x^B)^2 + (a_y^B)^2} \sqrt{(s_x^N)^2 + (s_y^N)^2}$$

$$\sin(\phi_{max}) = [1 - \sqrt{\cos(\theta_{max})^2}\ ]$$

What has been accomplished is to solve for the range $\pm\theta_{max}$ of vehicle motion that is possible, or "left over," given that the first baseline $a_1$ aligns with a known vector $s^N$.

The next step is to solve for the minimum and maximum projection of second baseline $a_2^N$ onto the incident direction of satellite signal arrival $u^N$, given that first baseline $a_1^N$ is aligned with $s^N$, and that the allowable vehicle motion is given by a rotation about $s^N$, through any angle up to $\pm\theta_{max}$.

Rather than solving the dot product $a^N \cdot u^N$ directly, to obtain the 3-dimensional projection of $a_2^N$ onto $u^N$, it simplifies the task to take the dot product apart, and then put it back together again. The result will be a two-dimensional problem that is much easier to solve than a corresponding 3-dimensional problem.

The key is to recognize that if the vehicle is rotating about $a_1^N = s^N$, then the dot product $a_2^N \cdot u^N$ has a component that is not changing, provided that an appropriate coordinate system is used in which to form the dot product. If a principal axis of the new coordinate system is $a_1^N$, and if the rotation is only about $a_1^N$, then the portion of the dot product given by the projection of $a_2^N$ onto $a_1^N$, times the projection of $u^N$ onto $a_1^N$, is constant. That portion can be subtracted, leaving a 2-dimensional problem.

Figure 6:
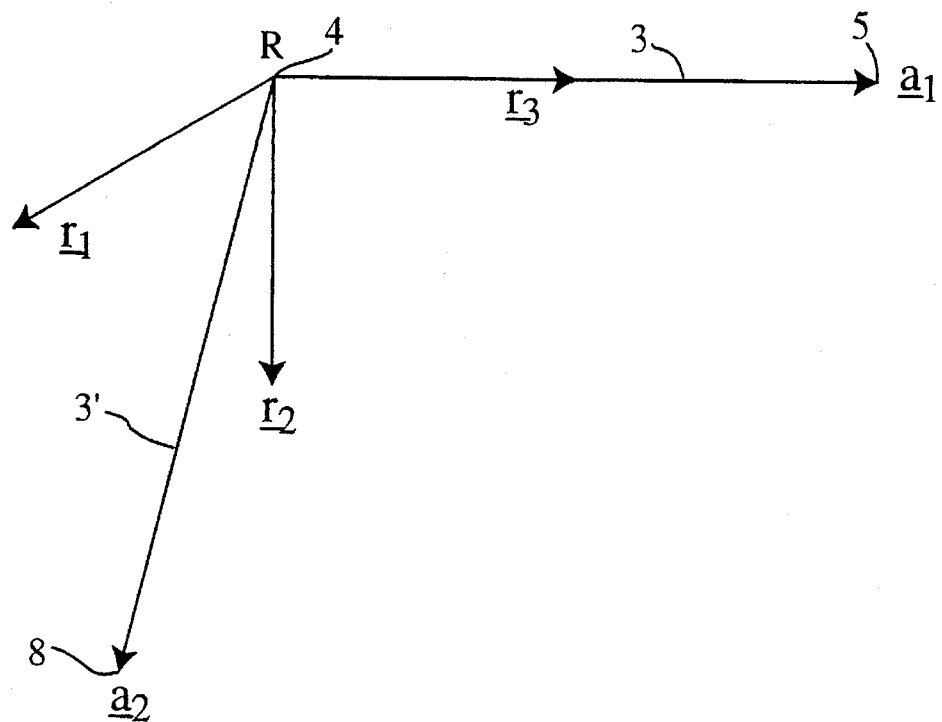
FIG. 6 is a diagram of a coordinate system R with axes r1, r2, and r3, in which the first baseline is aligned with r3, according to the present invention.

FIG. 6 is a diagram of a coordinate system R with axes r1, r2, and r3, in which the first baseline is aligned with r3, according to the present invention. As shown in FIG. 6 according to the present invention, a coordinate system R is constructed with axes, $r_1 = a_2^N \times a_1^N/|a_2^N \times a_1^N|$, $r_2 = a_1^N \times r_1/|a_1^N \times r_1|$, and $r_3 = a_1^N/|a_1^N|$, where $a_1^N = s^N$ $\phi = 0$. For purposes of constructing R, $a_1^N$ is available as a given, and $a_2^N$ is given by twirling and tilting the vehicle to bring $a_1^N$ into alignment with $s^N$. The vectors $r_1$, $r_2$, $r_3$ are all unit length and mutually orthogonal.

Satellite line of sight $u^N$ expressed in the R coordinate system is given by $c=(c_1,c_2,c_3)$, and antenna vector 2 in the R system is $d=(d_1,d_2,d_3)$, where $c_1=r_1 \cdot u^N$, $c_2=r_2 \cdot u^N$, $c_3=r_3 \cdot u^N$, $d_1=r_1 \cdot a_2^N=0, d_2=r_2 \cdot a_2^N$, and $d_3=r_3 \cdot a_2^N$, where $d_1$ is zero because $r_1$ is orthogonal to $a_2^N$, having been generated by the cross product of $a_2^N$ and another vector. The vector dot product in R system is $a_2^N \cdot u^N = c \cdot d = c_1 d_1 + c_2 d_2 + c_3 d_3$, where $c_1 = 0$ and d2 and c3 are constant.

Figure 7:
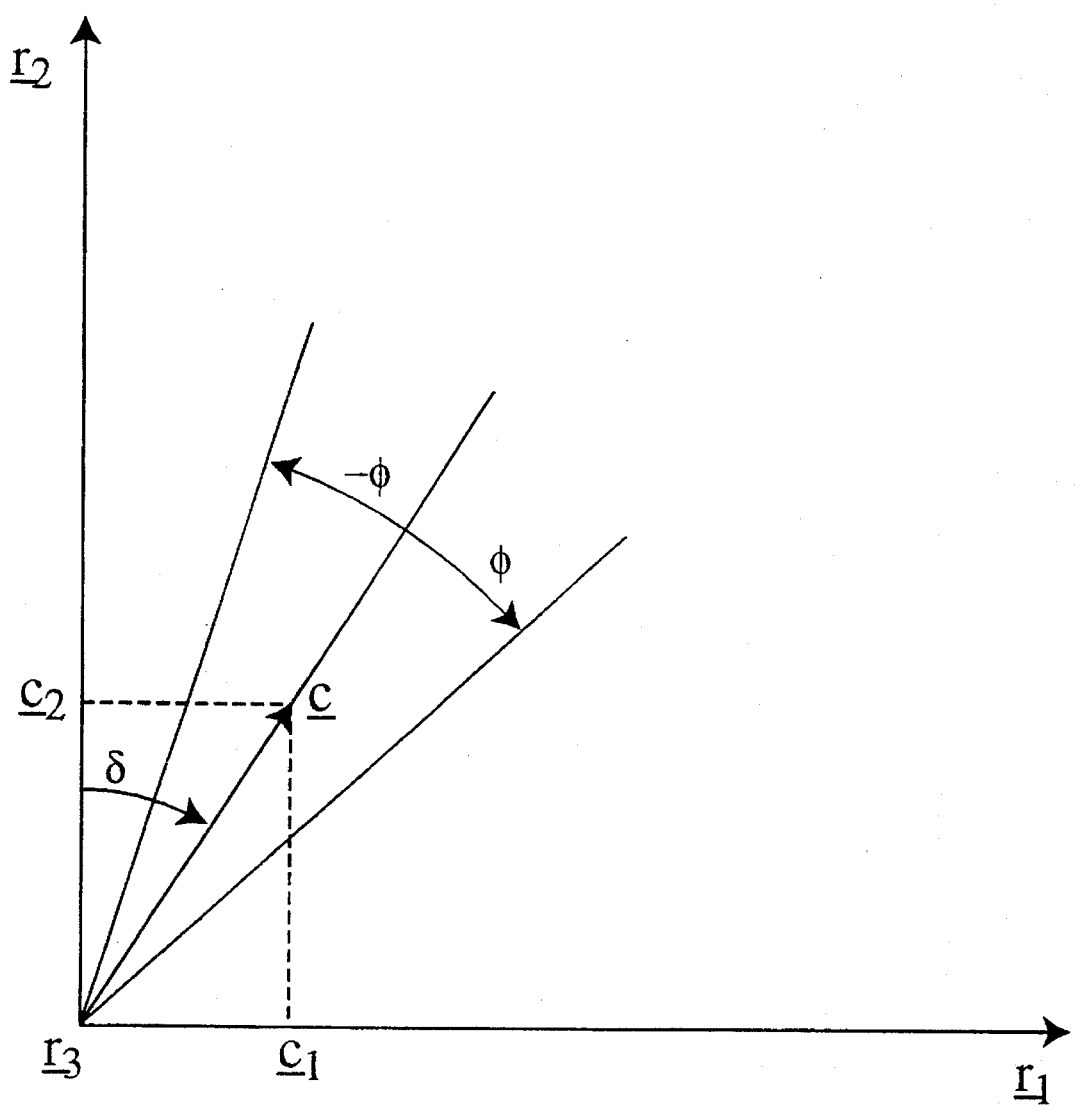
FIG. 7 is a diagram of a satellite line of sight vector making an angle delta in the r1×r2 plane, adding to delta the vehicle rotation phi about r3, normalizing c to unit length to provide the sines and cosines of delta, permitting determination of the range summing delta and phi to find minimum and maximum values of c2d2 as phi is varied over an allowable range, and providing the range pmin . . . pmax of possible integer values, according to the present invention.

FIG. 7 is a diagram of a satellite line of sight vector making an angle delta in the r1×r2 plane, adding to $\delta$ the vehicle rotation $\phi$ about r3, normalizing c to unit length to provide the sines and cosines of $\delta$, permitting determination of the range summing $\delta$ and $\phi$ to find minimum and maximum values of c2d2 as $\phi$ is varied over an allowable range, and providing the range pmin . . . pmax of possible integer values, according to the present invention.

Looking straight down $r_3$, as shown in FIG. 7, the satellite line of sight vector c makes an angle $\delta$ in the $r_1 \times r_2$ plane. To that angle $\delta$ will be added the vehicle rotation $\phi$ about $r_3$. Normalizing c to unit length gives the sines and cosines of $\delta$. The sines and cosines of $\phi_{max}$ are already known from the previous section. From there, it is a straightforward task, using angle addition formulas and tests for $\phi+\delta$, to find the sines and cosines of $(\delta+\phi_{max})$, and to test the range of $\delta+\phi$ to find the minimum and maximum values of $c_2 d_2$ as $\phi$ is varied over the allowable range. Adding the constant $c_3 d_3$ gives the range $(p_{min} \ldots p_{max})$ of possible values for $p=c_2^N \cdot u^N$, given that $a_1^N=s^N$ and that the vehicle can only tilt to a maximum $tilt_{max}$.

The foregoing is sufficient to determine the range of carrier cycle integers for second baseline. The code described below allows for all possible carrier cycle integers, without allowing any extra integers.

PROGRAM FOR SECOND BASELINE;

{ define a vector and a matrix } type vec = array [1..3] of double;
   mat = array [1..3, 1..3] of double;

const { constants }
   { conversion from degrees to radians }
   DEGREES = 0.0174532925199433;

{ carrier phase measurement standard deviation, in wavelengths }
sig_phase_meas = 10 / 360.0;

{ antenna vectors, wavelengths, body frame, test case } a1:vec = ( 5, 0, -0.15);
a2:vec = ( 1, 5, 1);

{the maximum angle that vehicle can tilt or tip, away from level } max_tip = 15 * DEGREES;
   { to make it easier to read some of the indices of arrays } x = 1;
y = 2;
z = 3;

{ program variables }
var
    { set at initialization }
   st,ct, b1,b2,b1h,an1h1, ct2,st2: double;
   an1,an2,ah1: vec;

{ set for the first baseline }
   phi_max, cp,sp: double;
   constrained: boolean;
   rr1,rr2,w: vec;

s,u: vec;
   pmin,pmax: double;
   umat: array [1..20] of vec;

irand: longint;
   sigB1a: double;

{-----------------------------}
{  utility routines           }

{-----------------------------}

{ vector dot product }
function dot (A,B: vec): double;
begin
  dot := a[1]*b[1] + a[2]*b[2] + a[3]*b[3];
end;

{ arc tangent of y/x, with quadrant test }
function atan2 (y,x: double): double;
var t: double;
begin
  if abs(x) < 1e-12
    then
      if y > 0
        then t := pi/2.0
        else t := -pi/2.0
    else
      begin
      t := arctan( y/x );
      if x < 0 then t := t+pi;
      if t > pi then t := t - 2*pi;
      end;
  atan2 := t;
end;

{Uniform [0..1] random number generator}
function unif: double;
begin
  irand := irand * 1295802987;
  unif := ((irand / (2147483647.0 * 2)) + 0.5);
end;

{gaussian random number generator. zero mean, std = 1}
Function gauss: double;
  var
    sum: double;
    i: integer;
  begin

```
    sum := -6;
    for i := 1 to 12 do sum := sum + {urand} Random;
    gauss := sum;
  end;
```

{ compute body-to-level direction cosines, from attitude euler angles }

```
procedure computecbl ( roll, pitch, azimuth: double;
     var cbl: mat );
var
  sr,sp,sa, cr,cp,ca: double;
  srsp, srcp, crsp, crcp: double;

begin
  sr := sin( roll    );
  sp := sin( pitch   );
  sa := sin( azimuth );
  cr := cos( roll    );
  cp := cos( pitch   );
  ca := cos( azimuth );
  srsp := sr * sp;
  srcp := sr * cp;
  crsp := cr * sp;
  crcp := cr * cp;
  cbl[1,1] :=  cr*ca+sa*srsp;
  cbl[2,1] := -cr*sa+ca*srsp;
  cbl[3,1] := -srcp;
  cbl[1,2] :=  cp*sa;
  cbl[2,2] :=  cp*ca;
  cbl[3,2] :=  sp;
  cbl[1,3] :=  sr*ca-sa*crsp;
  cbl[2,3] := -sa*sr-ca*crsp;
  cbl[3,3] :=  crcp;
end;
```

{ register an error }
```
procedure er (i:integer);
  begin
  writeln ('error ',i:1);
``` end;

{---------------------------------}
{ method under test     }
{---------------------------------} procedure once_at_initialization;
var
  i: integer;
  temp: double;

begin
    { sine, cosine of max tip, with 0.6 degrees of margin } st := sin(max_tip + 0.01);
    ct := cos(max_tip + 0.01);

{baselength}
    b1 := sqrt(dot(a1,a1));
    b2 := sqrt(dot(a2,a2));

{ normalized 3-d vectors }
    for i := x to z do
      begin
      an1[i] := a1[i] / b1;
      an2[i] := a2[i] / b2;
      end;

an1hl := sqrt( (an1[x]*an1[x]+an1[y]*an1[y]) );
    {baselength as only seen in the horizontal plane} b1h := sqrt(a1[x]*a1[x]+a1[y]*a1[y]);
    ah1[1] := a1[1] / b1h;
    ah1[2] := a1[2] / b1h;

{ sine/cosine of angle from body vertical to first baseline,
      in body frame }

```
ct2 := an1[z];
temp := 1-ct2*ct2;
if temp > 0 then st2 := sqrt(temp) else st2 := 0;

end;

procedure once_per_first_baseline_candidate;
var
   slen,slenh, cth,sth, cal,sal, ct1,st1, temp: double;
   cgam,sgam: double;
   i: integer;
   sn,sh,t1,t2: vec;

begin
    { normalized 3-d vectors }
   slen := sqrt(s[x]*s[x]+s[y]*s[y]+s[z]*s[z]);
   sn[x] := s[x] / slen;
   sn[y] := s[y] / slen;
   sn[z] := s[z] / slen;

{ normalized 2-d vectors }
   slenh := sqrt(s[x]*s[x]+s[y]*s[y]);
   sh[x] := s[x] / slenh;
   sh[y] := s[y] / slenh;

{sin, cos theta that rotates a1 to X-Z plane}
   cth :=   ah1[x];
   sth := - ah1[y];

{sin, cos alpha that rotates from X-Z plane to s, the known
    baseline}
   cal := sh[x];
   sal := sh[y];

{sin, cos gama that is the minimum tip experienced that
       can align a1 with the candidate baseline 1 axis } ct1 := sn[z];
```

```
temp := 1-ct1*ct1;
if temp > 0 then st1 := sqrt(temp) else st1 := 0;

cgam := ct1*ct2 + st1*st2;
sgam := st1*ct2 - ct1*st2;
```

{ Twirl and tip the vehicle so that first baseline aligns with
    candidate axis. Now find out what the second
    baseline looks like, as viewed from the ENU frame. }

```
t1[x] := cth*an2[x] - sth*an2[y];
t1[y] := sth*an2[x] + cth*an2[y];
t1[z] := an2[z]            ;

t2[x] := cgam*t1[x] + sgam*t1[z];
t2[y] := t1[y];
t2[z] :=-sgam*t1[x] + cgam*t1[z];

w[x] := cal*t2[x] - sal*t2[y];
w[y] := sal*t2[x] + cal*t2[y];
w[z] := t2[z]          ;
```

{ Find the angle phi of rotation about first baseline so that
    vehicle tip limit is just reached. In some cases, phi can be
    anything without exceeding vehicle tip limit. }

```
temp := an1hl * sqrt( sn[x]*sn[x]+sn[y]*sn[y] );
if temp > 1e-9 then cp := (ct - an1[z]*sn[z]) / temp
        else cp := -2;
temp := 1-cp*cp;
constrained := temp > 1e-18;
if constrained then
   begin
   sp := sqrt(temp);
   phi_max := atan2( sp, cp );
   end;
```

{ second baseline can be expressed as a linear combination of
  three vectors; the first baseline, and two vectors
  perpendicular to the first baseline } rr1[1] := w[2]*sn[3] - w[3]*sn[2];
rr1[2] := w[3]*sn[1] - w[1]*sn[3];
rr1[3] := w[1]*sn[2] - w[2]*sn[1];

rr2[1] := sn[2]*rr1[3] - sn[3]*rr1[2];
rr2[2] := sn[3]*rr1[1] - sn[1]*rr1[3];
rr2[3] := sn[1]*rr1[2] - sn[2]*rr1[1];

end;

procedure once_per_satellite;
var
  c1,c2,c3,c, del, thet1,thet2, q1,q2, qmin,qmax: double;

begin

{ Second baseline is described as a linear combination of
    three orthogonal vectors. Instead of finding the
    projection of satellite line of sight onto second
    baseline directly, find the projection onto the three
    orthogonal vectors, and then put the pieces back together. } c1 := u[x]*rr1[x] + u[y]*rr1[y] + u[z]*rr1[z];
  c2 := u[x]*rr2[x] + u[y]*rr2[y] + u[z]*rr2[z];
  c3 := u[x]*w [x] + u[y]*w [y] + u[z]*w [z] - c2;

{ to normalize first two vectors to unit length } c := sqrt(c1*c1 + c2*c2);

{ Collapse the remainder of the problem to the plane
  perpendicular to the first baseline. The two-dimensional
  problem is much easier to solve. } if constrained then begin

{ find the sine of angle to which baseline 2 is rotated toward
or away from satellite, at the two extremes of vehicle rotation
    about first baseline.  cp,sp are cosine, sine of max_phi }

```
if c > 1e-9
  then
    begin
    q1 := (c2*cp-c1*sp)/c;
    q2 := (c2*cp+c1*sp)/c;
    end
  else
    begin
    q1 := 0;
    q2 := 0;
    end;

if q2 > q1 then begin qmax := q2; qmin := q1 end
        else begin qmax := q1; qmin := q2 end;
```

{ baseline 2 is already rotated toward or away from satellite
  by an angle delta, even with phi = 0 } del := atan2(c2,c1);

{ add that nominal rotation to the limits of phi, which were set
    by limits on vehicle tip. } thet1 := del - phi_max;
thet2 := del + phi_max;

{ check for a min or max between the limits of theta } if ((thet1<-270*degrees)and(thet2>-270*degrees)) or
    ((thet1<90*degrees)and(thet2>90*degrees)) then qmax := 1;

if ((thet1<-90*degrees)and(thet2>-90*degrees)) or

```
      ((thet1<270*degrees)and(thet2>270*degrees)) then qmin := -1;

end else
    begin

{ there is no constraint on phi.  sine theta can hit either limit. } qmin := -1;
      qmax := +1;
    end;

{ min/max projection of second baseline onto sat line of sight } pmin := (c3 + c*qmin - 6*sigB1a) * b2;
    pmax := (c3 + c*qmax + 6*sigB1a) * b2;

end;

{----------------------------------}
{   test driver, main program      }
{----------------------------------}
var
  i: integer;
  az,pitch,roll: double;
  cbl: mat;
  al: vec;
  p,temp: double;
  icycle: longint;

begin

{ seed for random number generator } irand := 039580200;

{ first part of method under test }
``` once_at_initialization;

{ cycle through a large number of sample vehicle orientations } for icycle := 1 to 150000 do
  begin

{Generate random vehicle attitudes. Azimuth uniformly distributed 0-360 degrees. Roll and pitch uniformly distributed. Keep rejecting attitudes until one is found satisfying the maximum tilt restriction. }

```
repeat
   az := unif * 360 * DEGREES;
   pitch := (unif*2-1) * max_tip;
   roll  := (unif*2-1) * max_tip;
   computecbl ( roll,pitch,az, cbl );
until cbl[3,3] > cos(max_tip);
```

{ Generate 20 random satellite line of sight vectors. These point into the direction of incident signal arrival, and are uniformly distributed over the sky. }

```
for i := 1 to 20 do
   begin
   u[x] := gauss;
   u[y] := gauss;
   u[z] := abs(gauss);
   temp := dot(u,u);
   if temp < 1e-18 then
      begin
      u[z] := 1;
      temp := 1;
      end;
   temp := 1 / sqrt(temp);
   umat[i,x] := u[x]*temp;
   umat[i,y] := u[y]*temp;
   umat[i,z] := u[z]*temp;
   end;
```

{ Antenna vector in navigation frame, east/north/up,
computed from antenna vector in body frame. } for i := 1 to 3 do
  a1[i] := cbl[i,1]*a2[1] + cbl[i,2]*a2[2] +cbl[i,3]*a2[3];

{ Angular uncertainty in first baseline solution, due to
uncertainty in the measurement of carrier phase. } sigB1a := 4 * sig_phase_meas / b1;

{ Simulate first baseline solution, with error } for i := 1 to 3 do
  s[i] := cbl[i,1]*a1[1] + cbl[i,2]*a1[2] +cbl[i,3]*a1[3]
    + 3 * sig_phase_meas * gauss;

{ Method under test }
{ ------------------------- } once_per_first_baseline_candidate;

{ for each satellite, do... } for i := 1 to 20 do
  begin

{ the line of sight to that satellite } u := umat[i];

{ simulated whole phase measurement } p := dot(a1,u) + sig_phase_meas * gauss;

{Drive the method under test. Find the minimum and
maximum that the method believes is possible for p. }

```
        once_per_satellite;

{ Now see if it worked.  If limits are exceeded, then make a
             note of the failure. } if (p>pmax) or (p<pmin) then er(2);
           end;
        end;
end.
```

The method for baseline 2 can be split into three portions, in order to execute efficiently. One part only has to be executed at program turn-on, since it is only necessary to compute antenna baselengths and some other variables once. The second part only has to be executed once for each first baseline candidate. And the third part has to be executed for each combination of a baseline 1 candidate and a satellite received signal.

Most of computer execution time for, the method will be tied up in the third part, and so it is especially important that the third part be computationally efficient. There is an arc-tangent evaluation in the third part, but other than that, it is possible to avoid computer evaluation of transcendental functions. There is a square root evaluation in the third part, but when using a math co-processor, the square root evaluation only takes about 50% longer to evaluate than a simple multiply.

It is not necessary to normalize the basis vectors for coordinate system R. In other words, the step of determining $r_1 = a_2^N \times a_1^N / |a_2^N \times a_1^N|$, $r_2 = a_1^N \times r_1 / |a_1^N \times r_1|$, and $r_3 = a_1^N / |a_1^N|$, is modified to avoid the 9 evaluations of a divide. Instead, the un-normalized lengths can be carried along, and then accounted for later.

The method to determine carrier cycle from . . . to range for baseline 2 was tested, using the test program shown above. A large number of vehicle random orientations were generated, using a random number generator. Also, 20 random satellite positions were generated, uniformly distributed over the sky. For each satellite and vehicle combination, whole-value carrier phase measurements were simulated, including the simulation of carrier measurement error. It was verified that none of the simulated whole value phase measurements was larger than the maximum determined under test, or smaller than the minimum determined under test.

What is claimed is:

1. An attitude determination system, comprising:

first, second, and third GPS antennas, said second and third GPS antennas separated from said first GPS antenna by respective first and second baseline distances, said respective first and second baseline distances being greater than the length of a radio carder signal wavelength from satellites providing GPS signals to said first through third GPS antennas;

first and second pairs of first and second phase coherent GPS correlators connected respectively to said first and second antennas and said first and third antennas, and having respective first, second, third, and fourth correlator outputs derived from said GPS satellite radio carrier signal as independently received by each of said first and second and said first and third GPS antennas wherein said first, second, third, and fourth correlator outputs respectively include first and second phase differences;

at least a single computer connected to said respective first and second and first and third phase coherent GPS correlators for determining first through fourth pluralities of possible attitudes to first through fourth respective GPS satellites based upon respective first and second phase differences between said first and second and said third and fourth correlator outputs for a first radio carrier signal from said respective first through fourth GPS satellites, wherein said first through fourth pluralities of possible attitudes includes more than one possible attitude due to whole cycle carrier phase ambiguities; and at least a single attitude solution computer connected to said at least a single computer for comparing said first through fourth pluralities of possible attitudes and for identifying at least one geometry for said first, second, and third antennas by establishing first baseline integer position candidates given constraints on limited pitch of said first, second, and third antennas, based upon minimum and maximum projections of the first baseline for each satellite direction, and establishing second baseline integer position candidates, by pointing the first baseline into a candidate vector, swinging said first, second, and third antennas around the first baseline, determining an arc subject to tilt limitations and determining minimum and maximum projections of the second baseline onto each satellite vector, that satisfies at least three of said first through fourth plurality of possible attitudes and eliminating any additional geometries for said first, second and third antennas, that satisfies at least three of said first through fourth plurality of possible attitudes that have a less perfect fit to said respective geometries for the pair of antennas that satisfies four of the first through fourth plurality of possible attitudes.

2. The attitude determination system according to claim 1, wherein determining minimum and maximum projections of the second baseline onto each satellite vector includes determination of $$a_z^B s_z^N + \cos(\theta) \sqrt{(a_x^B)^2 + (a_y^B)^2} \sqrt{(s_x^N)^2 + (s_y^N)^2}, \text{ where:}$$

$a_z^B$ is the z component of the first baseline in a vehicle body reference frame, $s_z^N$ is the z component of a first baseline candidate vector in a navigation reference frame, θ is the angle between said first baseline and a satellite line of sight, $a_x^B$ is the x component of the first baseline in a vehicle body reference frame, $a_y^B$ is the y component of the first baseline in a vehicle body reference frame, $s_x^N$ is the x component of a first baseline candidate vector in a navigation reference frame, and $s_y^N$ is the y component of a first baseline candidate vector in a navigation reference frame.

3. The attitude determination system according to claim 2, wherein determining minimum and maximum projections of the second baseline onto each satellite vector includes establishing a coordinate system R, where $r_1 = a_2^N \times a_1^N / |a_2^N \times a_1^N|$, $r_2 = a_1^N \times r_1 / |a_1^N \times r_1|$, and $r_3 = a_1^N / |a_1^N|$; $a_1^N$ is a first component of a first baseline in a navigation reference frame; and $a_2^N$ is a second component of a first baseline in a navigation reference frame, wherein $a_2^N$ is determinable by twirling and tilting to bring $a_1^N$ into alignment with $s^N$.

4. A method of attitude determination for at least first, second, and third GPS antennas separated from each other by respective baseline distances greater than the carrier signal wavelength of GPS satellites monitored by said GPS antennas; and driving at least first and second pairs of first and second phase coherent GPS correlators connected respectively to first and second antennas-and said first and third GPS antennas, and having respective first, second, third, and fourth correlator outputs derived from said GPS satellite radio carrier signal as independently received by each of said first and second and said first and third GPS antennas wherein said first, second, third, and fourth correlator outputs respectively include first and second phase differences between said first and second and said third and fourth correlator outputs for a first radio carrier signal from said respective first through fourth GPS satellites, wherein said first through fourth pluralities of possible attitudes includes more than one possible attitude due to whole cycle carrier phase ambiguities, said method including the steps of:

establishing first baseline integer position candidates given constraints on limited pitch of said first, second, and third antennas, based upon minimum and maximum projections of the first baseline for each satellite direction, and establishing second baseline integer position candidates, by pointing the first baseline into a candidate vector, swinging said first, second, and third antennas around the first baseline, determining an arc subject to tilt limitations and determining minimum and maximum projections of the second baseline onto each satellite vector, that satisfies at least three of said first through fourth plurality of possible attitudes and eliminating any additional geometries for said first, second and third antennas, that satisfies at least three of said first through fourth plurality of possible attitudes that have a less perfect fit to said respective geometries for the pair of antennas that satisfies four of the first through fourth plurality of possible attitudes.

5. The method according to claim 4, wherein establishing first baseline integer position candidates includes identifying as representative of actual attitude at least one geometry of said first, second, and third antennas.

6. The method according to claim 4, wherein determining minimum and maximum projections of the second baseline onto each satellite vector includes determination of $$a_z^B s_z^N + \cos(\theta) \sqrt{(a_x^B)^2 + (a_y^B)^2} \sqrt{(s_x^N)^2 + (s_y^N)^2} \text{, where}$$

$a_z^B$ is the z component of the first baseline in a vehicle body reference frame, $s_z^N$ is the z component of a first baseline candidate vector in a navigation reference frame, $\theta$ is the angle between said first baseline and a satellite line of sight, $a_x^B$ is the x component of the first baseline in a vehicle body reference frame, $a_y^B$ is the y component of the first baseline in a vehicle body reference frame, $s_x^N$ is the x component of a first baseline candidate vector in a navigation reference frame, and $s_y^N$ is the y component of a first baseline candidate vector in a navigation reference frame.

7. The method according to claim 4, wherein determining minimum and maximum projections of the second baseline onto each satellite vector includes establishing a coordinate system R, where $r_1 = a_2^N \times a_1^N / |a_2^N \times a_1^N|$, $r_2 = a_1^N \times r_1 / |a_1^N \times r_1|$, and $r_3 = a_1^N / |a_1^N|$; $a_1^N$ is a first component of a first baseline in a navigation reference frame, and $a_2^N$ is a second component of a first baseline in a navigation reference frame, wherein $a_2^N$ is determinable by twirling and tilting to bring $a_1^N$ into alignment with $s^N$.

* * * * *